Patented Apr. 24, 1951

2,550,213

UNITED STATES PATENT OFFICE 2,550,213

HYGROSCOPIC MATERIALS

Harland H. Young, Chicago, Ill., assignor to Swift & Company, Chicago, Ill., a corporation of Illinois No Drawing. Application February 28, 1946, Serial No. 651,035

8 Claims. (Cl. 106—136)

This invention relates to plastics such as films, adhesives and the like, which are processed in aqueous media.

One of the objects of this invention is to provide an improved plastic composition of the type described.

Another object of this invention is to provide a plasticizing agent or hygroscopic material superior to the conventional substances employed at the present time.

A further object of this invention is to provide an improved adhesive which is nonhygroscopic and will not become tacky under humid conditions.

A further object of this invention is to provide an improved adhesive which will retain its original flexibility and adhesive qualities when dry although the product may be held for long storage periods.

This application is a continuation in part of my co-pending application Serial No. 451,230, filed July 16, 1942, now abandoned.

Glue and gelatin are employed in a wide variety of adhesives, printing rollers, coating compositions, duplicating rolls and also in the manufacture of films. Certain vegetable raw materials also find extensive use in the preparation of adhesives. These substances are frequently combined with hygroscopic materials to impart a desired flexibility to the dried product. In the preparation of adhesives consisting of an animal glue base, various polyhydroxy compounds have been employed such as glucose, sucrose, invert sugar, glycerol, polyglycerols, polyethylene glycols, and the like to impart the desired flexibility. Similarly, in the case of adhesives prepared from vegetable raw materials, certain hygroscopic materials have been employed such as glycerol, glycols, alkylolamines and the like.

In the manufacture of a wide variety of articles, a base material such as paper, cloth and the like is provided with a coating of an adhesive. In such products as gummed tape the ideal properties of an adhesive coating are somewhat conflicting. It is desired in such products that the adhesive shall retain its original flexibility and prompt remoistening values although the product may be stored over a long period of time. It is also desired that the adhesive shall have a very rapid resetting property after the application of moisture to the coating and yet the coating will not absorb sufficient amounts of moisture from the humidity of the atmosphere to become sticky or tacky.

Vegetable raw materials present a more difficult problem when employed in the manufacture of gummed labels since these materials dry out and crystallize with a resultant loosening of the labels. These disadvantages are particularly apparent in labels which are employed on smooth surfaces such as the surfaces of glass jars, metal containers and the like. Labels placed upon such surfaces will spring from the surface when the temperature of the surrounding atmosphere is relatively high and the humidity is correspondingly low. Such conditions are prevalent in heated storage rooms during the winter.

In the preparation of various types of films and the like from protein and cellulosic materials which are processed in aqueous media, a solution of a hygroscopic material or a plasticizer is employed in finishing the product, or the plasticizer or hygroscopic material may be incorporated in the aqueous solution or suspension of the protein or cellulosic material. In the preparation of films of cellulosic material, glycerol or glycols are commonly employed in an aqueous media which may serve as a washing medium or dyeing medium. In the case of films prepared from gelatin, the plasticizing material may be incorporated in the aqueous solution or suspension of gelatin before it is cast or formed.

A great many different types of substances have been employed as plasticizing agents for various applications of the base materials. Polyhydric alcohols such as glycerol, glycols, polyglycerols, polyglycols, sugars and certain of their derivatives have been employed as well as more complex substances such as ethers, salts, and the like. The present invention is intended to provide a more effective plasticizing agent or hygroscopic material which may replace the plasticizing agents of the prior art to provide improved products.

In the preparation of animal glue adhesives certain hygroscopic materials such as glucose, sugar, glycerol, or mixtures of these materials have been proposed. Such large amounts of these materials are necessary to produce the desired flexibility and remoistening values that the dried adhesive possesses an undesirable property of becoming quite sticky or tacky in moist or humid atmospheres. It is readily appreciated that such conditions are extremely disadvantageous where the adhesive is to be employed in the manufacture of gummed tape and like products. If sufficient amounts of the hygroscopic materials are added to the animal glue base the adhesive is so hygroscopic that it will absorb sufficient quantities of moisture from the atmosphere, particularly in humid weather, to render the adhesive tacky whereby it will adhere to the uncoated side of the paper in the roll or stock. Another disadvantage is the fact that excess plasticizers retard the setting of the adhesive.

In the preparation of labeling adhesives from vegetable raw materials such large quantities of hygroscopic materials, for example, glycerol, ethylene glycol, ethanolamine and the like, are required to impart desired flexibility and remoistening values that the product does not possess proper setting characteristics.

The present invention contemplates the addition to the various plastics or the treatment of the various plastics with reaction products obtained by reacting secondary alkylolamines with acylating substances capable of replacing the amino hydrogen atom with certain classes of dibasic carboxylic acid radicals under such conditions of reaction as to produce, for the most part, the dicarboxylic acid diamide.

I have discovered that these reaction products are superior to the substances generally employed as plasticizing agents for the various purposes described. The reaction products contemplated by this invention and obtained by reacting secondary alkylolamines with the acylating substances include secondary reaction products, but the principal constituent of the reaction product is the diamide of the particular dicarboxylic acid which might be considered as having been derived from the acylating substance.

The reaction products which I employ are not to be confused with the alkylolamine salts of the acids. I have discovered that such compounds are not entirely satisfactory for the production of plastic compositions because they lose their plasticizing or hygroscopic properties in a very short period of time, particularly when employed in aqueous solutions. It is well known that this class of salts hydrolyze quite readily whereas the compounds contemplated by the present invention hydrolyze only under far more vigorous treatment, such as treatment with strong acids or strong alkalies.

I am also familiar with the reaction products obtained from reacting a monobasic acid with secondary alkylolamines or dibasic carboxylic acids with secondary or primary alkylolamines in such proportions and under such conditions as to obtain a greater proportion of monoamide compounds and substantially preclude the formation of the diamide compound, as is shown in Patents 2,146,873 and 2,170,845 to Willmanns and Woodhouse, respectively. I have discovered that the diamide compound, that is, the product resulting from the condensation of both carboxyl groups of the dibasic acid molecule with the secondary alkylolamine, is a superior and more effective plasticizing agent than the aforementioned monoamide products. Therefore, in accordance with my invention, the formation of the diamide compound is desired and conditions for its production are observed.

Dicarboxylic acid diamides which have been found to be particularly effective for the purposes of this invention may be represented by the following general formula:

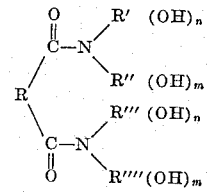

where

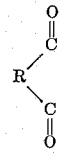

is an acyl radical of a dicarboxylic acid containing preferably no more than 4 carbon atoms in chain length, which atoms may or may not be substituted. The radicals $R'$, $R''$, $R'''$, and $R''''$ represent alkyl radicals linked on one hand to the amide nitrogen and on the other to one or more hydroxyl groups, and may or may not be the same. The letters, C, O, N, and H designate carbon, oxygen, nitrogen and hydrogen, respectively, and $m$ and $n$ designate small whole numbers.

Examples of satisfactory acids are oxalic, malic, maleic, succinic, malonic, fumaric, itaconic, tartaric, and citraconic. Satisfactory substituted dicarboxylic acids are those in which one or more of the hydrogen atoms have been replaced with a hydrophilic substituent group tending to promote solubility of the compound in water.

It is not necessary that the acid be employed as an acylating substance in the preparation of the reaction products since acid chlorides, acid anhydrides, esters of the acids, and the like, may be employed as the source of the acyl group. The acylating substance replaces the reactive amino hydrogen of the secondary alkylolamine.

Examples of satisfactory alkylolamines are as follows: diethanolamine; dipropanolamine, $$NH(CH_2CHOH—CH_3)_2$$

and $$(HOCH_2—CH(CH_3))_2NH$$

diglycerol amine and the like. The alkylolamines contemplated by this invention are those having one amino hydrogen atom and containing at least one, but preferably more than one, hydroxyl group in the alkyl chains. The alkyl chains differ and one may be more hydrophilic than the other.

Various methods may be employed in the preparation of the dicarboxylic acid diamides, three of the more common of which may be briefly described as follows: The alkylolamine and the dicarboxylic acid are mixed in such proportions as to effect neutralization of all carboxylic groups by the alkylolamine. Water may be added if necessary, the resulting mixture being heated to temperatures from about 130° C. to 170° C., which have been found to be particularly satisfactory for this reaction. The reaction product may be subsequently bleached and deodorized by conventional methods.

A further common method for preparing the alkylolamide or reaction product is by the reaction of the acid chloride of the dicarboxylic acid with the alkylolamine in the proper proportions. This reaction is preferably carried out at low temperatures in the presence of pyridine or quinoline or other nitrogen-containing compound having the ability to fix the hydrogen chloride evolved during the reaction. In this synthesis care must be exercised because of the reactivity of the alcoholic function in the alkylolamine toward the acid chloride.

In another of the common methods the alkylolamine and an ester of the dicarboxylic acid, for example, an oxalate, are mixed in the proper proportions and the mixture heated to temperatures at which the alcohol splits out and is distilled off.

Compounds of the present invention are preferably those whose acyl groups contain not more than 4 carbon atoms in chain length to insure a substance which is fairly well soluble in hydrophilic solvents such as water, ethyl and methyl alcohols and the like. Acylating substances having carbon chains with more than 4 carbon atoms are not necessarily unsatisfactory for the purposes of this invention since previous substitution in the chain may have imparted sufficient hydrophilic properties so that it is entirely satisfactory for the purpose of this invention. Similarly, branched chained groups having certain substituents but containing more than 4 carbon atoms may be entirely satisfactory for the present invention.

By way of illustration, but not by way of limitation, the following specific alkylolamides may be enumerated as being very satisfactory for the purposes of the present invention.

I. The diamide or reaction product obtained by condensing oxalic acid with diethanolamine whereby 2 moles of water are removed per mole of dibasic acid used.

$$(HOCH_2CH_2)_2N\overset{O}{\overset{\|}{C}}-\overset{O}{\overset{\|}{C}}-N(CH_2CH_2OH)_2$$

II. The diamide or reaction product obtained by condensing oxalic acid with diglycerolamine whereby 2 moles of water are removed per mole of dibasic acid used.

$$(HOCH_2CHOHCH_2)_2N\overset{O}{\overset{\|}{C}}-\overset{O}{\overset{\|}{C}}N(CH_2CHOHCH_2OH)_2$$

III. The diamide or reaction product obtained by condensing maleic acid with diethanolamine whereby 2 moles of water are removed per mole of dibasic acid used.

$$(HOCH_2CH_2)_2N\overset{O}{\overset{\|}{C}}.C_2H_2\overset{O}{\overset{\|}{C}}-N(CH_2CH_2OH)_2$$

IV. The amide or reaction product obtained by condensing maleic acid with diglycerolamine whereby 2 moles of water are removed per mole of dibasic acid used.

$$(HOCH_2CHOHCH_2)_2N.\overset{O}{\overset{\|}{C}}.C_2H_2.\overset{O}{\overset{\|}{C}}-N(CH_2CHOHCH_2OH)_2$$

V. The diamide or reaction product obtained by condensing malonic acid with diethanolamine whereby 2 moles of water are removed per mole of dibasic acid used.

$$(HOCH_2CH_2)_2N.\overset{O}{\overset{\|}{C}}CH_2\overset{O}{\overset{\|}{C}}N)CH_2CH_2OH)_2$$

VI. The diamide or reaction product obtained by condensing succinic acid with diethanolamine whereby 2 moles of water are removed per mole of dibasic acid used.

$$(HOCH_2CH_2)_2N\overset{O}{\overset{\|}{C}}CH_2CH_2\overset{O}{\overset{\|}{C}}-N(CH_2CH_2OH)_2$$

VII. The diamide or reaction product obtained by condensing tartaric acid with diethanolamine whereby 2 moles of water are removed per mole of dibasic acid used.

$$(HOCH_2CH_2)_2N\overset{O}{\overset{\|}{C}}(CHOH)_2\overset{O}{\overset{\|}{C}}N(CH_2CH_2OH)_2$$

Of the above compounds, that prepared with oxalic acid and diethanolamine is the preferred one. The following specific example is a preferred method of its preparation, a method which is also applicable to the preparation of other compounds, such as those obtained by reacting succinic and tartaric acids with diethanolamine, etc.

Example.—One mole (126 g.) of oxalic acid dihydrate is mixed with 2 moles (210 g.) of diethanolamine. The mixture is heated for 3 hours at 160° C. under reduced pressure, during which time water is evolved. The product is an amber color, viscous liquid completely miscible with water. The same reaction may be carried out at atmospheric pressure at a temperature of 180 to 200° C. for a period of an hour and a half. The other compounds may be prepared using the same procedure.

Similar diamides or reaction products may be prepared from other acids such as enumerated hereinbefore. These various substances are very soluble in water and other hydrophilic solvents. If the alkyl or alkylene radicals in the amino compounds consists of such straight chain groups containing more than 6 carbon atoms, the substances are not sufficiently hydrophilic for the purposes of the present invention. It is apparent from the foregoing considerations that the substances employed as plasticizing agents or humectants in accordance with this invention should be highly hydrophilic in character. I prefer to employ such compounds as contain at least two hydroxyl groups in the amine portion of the compound. However, it is apparent that compounds having one hydroxyl group in the amine portion of the molecule and other substituents in their structure may be entirely satisfactory depending upon the individual compound.

The amount or quantity of the hygroscopic material which is employed in preparing the compositions of this invention may be varied over a considerable range depending upon the constituents of the indivdiual composition and upon the particular properties desired in the final product.

There are several classes of animal glue products which are adapted for various uses, such as flexible glues, liquid glues, and adhesives and dry glues.

Flexible glues find particular uses in book binding, lamination of various types of fibrous materials and in the manufacture of printer rollers and the like. In this type of work, the glue product remains in a somewhat rubbery, tough and plastic condition. For example, in the manufacture of printer rollers, dry glue, a plasticizing agent and a preservative, generally in the form of a phenolic composition, are heated and mixed and cast into the desired form. The product remains as a rubbery mass. In the preparation of such products up to about 150 per cent, based upon the weight of the glue, plasticizing agent of the type described herein, is employed.

A very satisfactory flexible glue may be prepared by mixing equal parts of hide glue and plasticizer and dissolving or dispersing this mixture in water in the proportion of about two parts of water to three parts of the glue-plasticizer mixture. If desired, a common coloring matter may be employed. A usual preservative such as the phenolic compositions, for example, naphthols, phenols and chloro-phenols and perfumes such as balsam, pine, citrene, citronella, and the like, may be incorporated in the glue.

An animal glue product having prompt remoistening values and a rapid resetting quality may be prepared by incorporating in the glue liquor up to about 150 per cent of a plasticizing agent of the type described, based upon the weight of the dry glue. The liquor may then be dried in any desired manner. The dry product, although it has prompt remoistening values, is not so hygroscopic in character as to absorb sufficient moisture from the surrounding atmosphere that it becomes tacky.

A liquid animal glue composition, that is, an adhesive comprising an animal glue base, which has the property of existing in a liquid state at ordinary temperatures and of being hygroscopic when dried may be prepared by increasing the proportion of plasticizing agent. Such a liquid animal glue product may be prepared by adding the desired quantity of plasticizing agent to the glue liquor or solution and then concentrating the liquor. Such liquid glue products are entirely satisfactory as labeling adhesives.

In the preparation of liquid glues, various substances have been employed to render the glue capable of existing in a liquid state at ordinary room temperatures.

In the United States Patent No. 1,950,483, there is disclosed a method of preparing a liquid glue product by adding at least 20 per cent urea to the glue. These liquid glues may be further improved by incorporating in the glue the plasticizing agent of the present invention. The addition of up to about 20 per cent plasticizing agent as described hereinbefore, based upon the weight of the glue solids, greatly increases the flexibility of the dried glue product. Greater proportions of the plasticizing agent can be employed; however, the larger amounts retard the setting and drying of the glue and for this reason are not desirable. It is apparent that for certain purposes larger amounts, however, may be desired.

In the preparation of dry glue products, the reaction products described hereinbefore may serve as general plasticizing agents. Dry glue products which are marketed for use in the manufacture of gummed tape may be greatly improved by the addition of from about 3 per cent to 15 per cent of the plasticizing agent. Such quantities of the plasticizing agent increase appreciably the flexibility of the adhesive coating on the tape. For this use, the amount of plasticizing agent may be greater than that set forth and is dependent upon the various factors which have been discussed hereinbefore. It is apparent that the amount of plasticizer should not be so great that the adhesive composition will absorb sufficient moisture from the atmosphere so that the coating becomes sticky or tacky.

Similarly, vegetable adhesive compositions may be prepared from vegetable raw materials consisting of vegetable materials having a carbohydrate base such as dextrines, starches, flours and other carbohydrate adhesive bases of vegetable origin such as gums and sugars. These base materials may be termed amylaceous vegetable adhesives and include such materials as highly converted low viscosity dextrines which are not ordinarily suited for labeling adhesive purposes because of their tendency to crystallize. Satisfactory adhesives may be prepared from these vegetable raw materials by adding from about 15 per cent to 60 per cent of a plasticizing agent described in this application, as based on the weight of adhesive solids. The exact amount or proportion of the agent which is required depends upon the specific base material, the specific plasticizing agent or humectant and the properties desired in the final product. Vegetable adhesives containing the hygroscopic materials of this invention when dried, form a rather tough pliable film which does not crystallize and which will not powder off surfaces to which it is attached. These vegetable adhesives will not become tacky or sticky under humid conditions.

Adhesives may also be prepared by adding the plasticizing agents or hygroscopic materials to a mixture of animal glue and vegetable adhesive materials such as set forth above. Such adhesive is particularly well suited for the manufacture of gummed sheets or gummed tape which may be stored over a long period of time without adversely affecting the original flexibility and other properties of the adhesive. Such adhesives are not so hygroscopic that they absorb sufficient quantities of moisture from humid atmospheres to cause the adhesive to become tacky. The proportion of the ingredients of the adhesive may be varied appreciably and are in a large measure governed by the type of adhesive which is desired for marketing purposes. The maximum limit of the quantity of the hygroscopic material incorporated in the adhesive is an amount which is insufficient to impart hygroscopicity to the dried adhesive film.

Satisfactory adhesives of this class may comprise from about 20 per cent to 90 per cent animal glue, from about 2 per cent to 50 per cent vegetable adhesive and from about 1 per cent to 30 per cent of the plasticizing agent or humectant of this invention. A representative formula for a product to be marketed in dry form consists of about 65 per cent animal glue, 25 per cent dextrine, and 10 per cent of a plasticizing agent. If the product is to be marketed in a liquid form, the proportion of plasticizing agent is the same, as based on adhesive solids. It is not increased to such a point that the dry film will be hygroscopic. A representative formula for such a liquid adhesive consists of 35 per cent animal glue, 15 per cent dextrine, 10 per cent plasticizing agent and 40 per cent water.

Sheets or films may be prepared from protein solutions such as a gelatin solution by thoroughly mixing in the gelatin solution a quantity of a plasticizing or hygroscopic material of the type described herein. The resulting solution or liquor is then formed into a sheet or cast into a sheet of the desired thickness. The formation of the film from the liquor can be carried out in any desired manner. Sheets or films prepared in accordance with this method are very flexible and retain their original flexibility for an extended period of time.

In the preparation of films from cellulosic materials or cellulosic bases, the cellulose compound solution or dispersion is prepared in any convenient manner depending upon the particular cellulosic compound and the compound then cast or extruded to form a film. The film may be prepared from a solution or dispersion in which has been incorporated the desired amount of plasticizing agent or humectant of this invention. As an alternative method, the cast or formed sheet or film may be subjected to the action of a solution containing the plasticizing agent in the processing of the film prior to the drying of the film.

In the commercial practice of the present invention, the plasticizing agent or humectant preferably comprises the reaction products obtained by the reaction of a secondary alkylolamine with the dicarboxylic acid or other satisfactory acylating substance of the type described, and the reaction is preferably carried out under such conditions as to lead to the formation of a large proportion of the diamide. It is not necessary that the diamide be isolated and purified to form the plasticizing agent.

In general, the plasticizing agents have the property of retaining in the particular composition a sufficient amount of water or moisture to maintain the composition in a flexible or pliable form regardless of the amount of moisture which may be present in the surrounding atmosphere. These substances might therefore be classed as humectants or humidifying agents. It is apparent therefore that the reaction products described may be employed in compositions and in products other than the particular plastics which have been specifically set forth.

I have found that the plasticizers or humectants are also satisfactory in the production of tobacco products. It is well known that in the manufacture of such articles as cigarettes, a small amount of a humectant such as glycerine, ethylene glycol, diethylene glycol, and the like, are employed in treating the tobacco. These substances prevent a complete drying out of the products by retaining a certain amount of moisture. The humectants described in this application may be substituted for the conventional humectants and may be employed in approximately the same amounts.

The term "gelatinous material" is employed herein to designate all grades of animal glue and gelatin.

The term "plastics" is employed herein to include animal glues and gelatins, amylaceous vegetable adhesive bases, cellulose derivatives and the like.

It is to be understood that the foregoing description and specific examples are merely illustrative of my invention and are not intended as limitations. Various modifications will suggest themselves to those skilled in the art and it is obvious that many modifications may be made without departing from the spirit and scope of this invention.

I claim:

1. A composition of matter for producing an improved adhesive film having prompt remoistening and rapid resetting properties comprising: an aqueous solution of a water-soluble plastic film-forming material selected from the group consisting of animal glue adhesives and amylaceous vegetable adhesives containing a water-soluble diamide of a secondary alkylolamine and an aliphatic dicarboxylic acid as a plasticizer and humectant for the said plastic film-forming material.

2. A composition of matter substantially as described in claim 1 wherein the alkyl radicals in the secondary alkylolamine consists of straight chain groups containing not more than 6 carbon atoms and wherein the aliphatic acyl radical in the dicarboxylic acid contains not more than 4 carbon atoms in the straight carbon chain.

3. A composition of matter suitable for gummed tapes substantially as described in claim 2 wherein from about 3 to 15 percent of the water-soluble diamide is added to the film-forming material based on the dry weight thereof when said adhesive material is comprised essentially of an animal glue adhesive.

4. A composition of matter substantially as described in claim 2 wherein from about 15 to 60 percent of the water-soluble diamide is added to the film-forming material based on the dry weight thereof when said material is comprised essentially of an amylaceous vegetable adhesive.

5. An improved adhesive film which comprises: a plastic film-forming material selected from the group consisting of animal glue adhesives and amylaceous vegetable adhesives containing as a plasticizer and humectant a water-soluble diamide of a secondary alklolamine and a water soluble dicarboxylic acid, said adhesive film having prompt remoistening and rapid resetting properties.

6. An improved adhesive film substantially as described in claim 5 wherein the alkyl radicals in the secondary alkylolamine consists of straight chain groups containing not more than 6 carbon atoms in the alkyl group and wherein the aliphatic acyl radical in the dicarboxylic acid contains not more than 4 carbon atoms in the straight carbon chain.

7. An improved adhesive film suitable for gummed tapes substantially as described in claim 6 wherein the film-forming material contains from about 3 to 15 percent of the water-soluble diamide based on the dry weight thereof when said adhesive material is comprised essentially of an animal glue adhesive.

8. An improved adhesive film substantially as described in claim 6 wherein the film-forming material contains from about 15 to 60 percent of the water-soluble diamide based on the dry weight thereof when said material is comprised essentially of an amylaceous vegetable adhesive.

HARLAND H. YOUNG.

REFERENCES CITED

The following references are of record in the file of this patent:

UNITED STATES PATENTS

| Number | Name | Date |
|---|---|---|
| 2,094,608 | Kritchevsky | Oct. 5, 1937 |
| 2,146,873 | Willmanns | Feb. 14, 1939 |
| 2,170,845 | Woodhouse | Aug. 29, 1939 |
| 2,250,664 | Watkins | July 29, 1941 |